United States Patent Office 2,886,180
Patented May 12, 1959

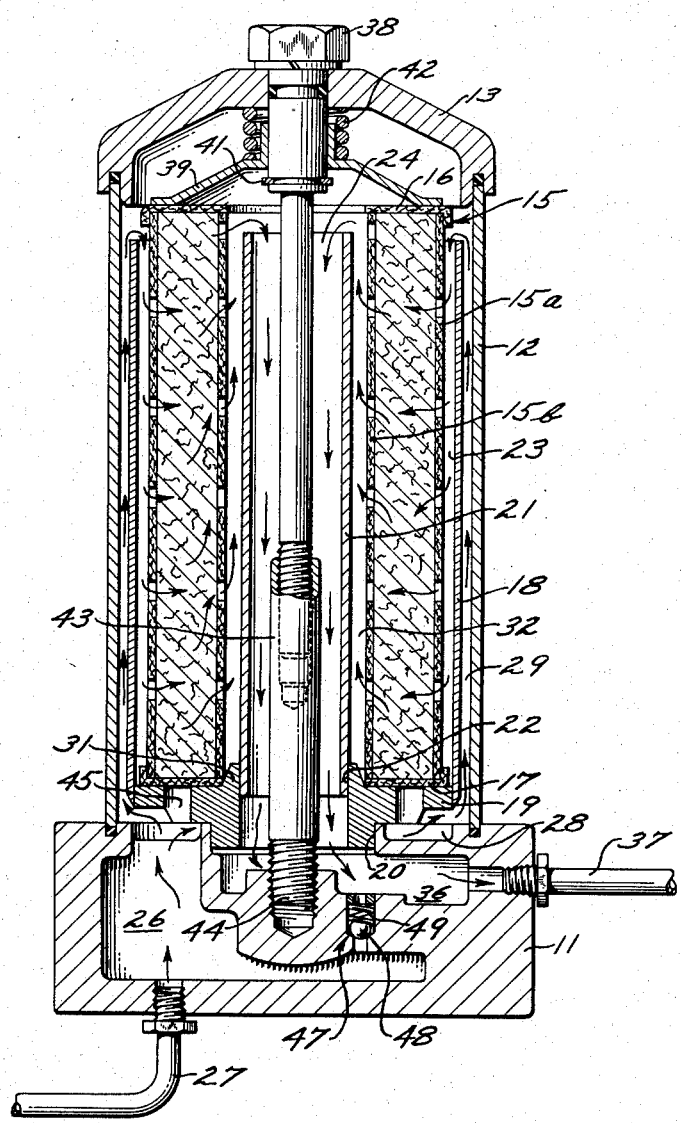

2,886,180

FULL FLOW FILTER WITH OIL RETAINING MEANS

Milford B. Morgan, Pekin, and Albert W. Crumrine, Peoria, Ill., assignors to Caterpillar Tractor Co., Peoria, Ill., a corporation of California Application March 19, 1956, Serial No. 572,367

4 Claims. (Cl. 210—438)

This invention relates to fluid filters generally and more particularly to an oil filter adapted to filter the lubricant employed in an internal combustion engine.

This invention is especially adapted for use in connection with full flow filters, effective to remove foreign particles from the full volume of pumped oil without restricting the flow of oil to the engine in order to insure that none of the abrasive solids entrained in the lubricant gain entrance to the areas of lubrication.

With dimensional tolerances becoming increasingly more critical in modern manufacturing practices, resulting in greater precision machining of the surfaces of mating working parts, it becomes imperative that preventive steps be taken to avoid the possibility of conveying abrasive particles to the bearings and other working parts of such mechanisms. Consequently, when the need arises to replace a filter element that has been clogged with impurities, it is necessary to completely remove the sediment from the chamber before inserting a new element in order to avoid transferring the impurities to the clean side of the filter chamber. Although some filters have contained drain valves such as petcocks or the like, for this purpose, they are not always fully effective and depend upon an operator taking care to use them properly. Failure to do so has resulted in wear, indicating that some automatic means to drain the harmful residue is necessary in order to avoid damage to engine components.

It is an object of this invention, therefore, to provide a lube oil filter for internal combustion engines and other accessory drives in which a suitable valve type structure formed in one of the filter components is automatically effective upon the removal of the filter element, to completely drain the unfiltered oil and sediment from the chamber prior to inserting a new filter element. Another object of this invention is to provide means to drain the unfiltered oil in this manner and simultaneously retain a supply of filtered oil in readiness immediately available for distribution to the spaced lubricating points upon restarting of the engine. Still another object is to provide a structure wherein separated chambers retain quantities of filtered and unfiltered oil in reserve immediately available upon restarting of the engine. Further and more specific objects will be made apparent in the following specification wherein reference is made to the accompanying drawing.

The drawing illustrates a longitudinal sectional view of a filter embodying the present invention showing what is commonly known as a full flow filter in which the entire volume of lubricating oil is conveyed through a pervious filter element which functions to separate the harmful impurities entrained in the oil, without restricting the flow.

In the drawing, the filter assembly comprises a base 11, a housing or case 12 and a cover assembly 13. A filter element 15, conventionally made of pervious resin impregnated paper, folded in accordion pleat fashion, has an outer perforated wrapper 15a and an inner perforated core 15b retaining it in a cylindrical form. Suitable non-pervious end caps 16 and 17 are cemented to each end thereof, completing the assembly and simultaneously sealing against the passage of oil over the longitudinal ends of the folds.

Retained within the housing 12 is an open end cylinder 18 joined to a plate member 19 which is supported in a suitable bore 20 formed in the base 11. A second cylinder 21, in spaced concentric relation to said first cylinder 18, is also secured to the plate member 19 in any suitable fashion as at 22. With the structure thus far described, it can be seen that the cylinders 18 and 21 aid in defining two separate chambers 23 and 24 which retain quantities of unfiltered and filtered oil respectively.

Formed in the filter base 11 is a cavity 26 which receives a continuous supply of unfiltered oil from the engine oil pump through a suitable conduit 27. Oil is transferred from cavity 26 to the chamber 23 through an annular recess 28 formed in the base 11 and a space 29 existing between the cylinder 18 and the case 12. The element 15 is retained in spaced concentric relation to the cylinder 21 by virtue of a piloting flange 31 integral with plate 19 which defines a space 32 through which filtered oil flows, from whence it overflows into chamber 24. Chamber 24 is connected to a second cavity 36 from which filtered oil is conveyed to spaced points of lubrication through a suitable conduit 37.

The cover assembly 13 comprises a retaining screw 38 having a circular flange member 39 slideably retained thereon by a snap ring 41. A spring 42 acting between the cap 13 and the flange member 39 create a leak-proof seal between end cap 16 of the element 15 when the retaining screw 38 is threaded into an upstanding stud 43 secured to the base 11 as at 44. The seal existing between the flange member 39 and the filter end cap 16 prevents the possibility of unfiltered oil gaining entrance into chamber 24.

With the structure thus far described, a column of filtered oil is retained within the chamber 24 in immediate readiness for distribution to spaced lubricating points whenever the engine is started after a shut-down period. Simultaneously a supply of unfiltered oil is retained in the chamber 23 preparatory to being filtered and is available for supplementing the filtered oil supply shortly after the engine is restarted.

In order to insure that substantially all of the sediment is drained from chamber 23 when a fouled element is removed and to eliminate the transfer of any residual impurities into chamber 32 before a new element is inserted, a suitable valve structure is incorporated within the chamber 23 which functions as follows. Formed in plate 19 are a plurality of apertures 45 which communicate with the annular recess 28 formed in the filter base 11. The impervious end cap 17 of the replaceable element 15 normally seals the apertures 45 against the flow of oil therethrough. When the filter element 15 is removed, as when it becomes fouled with impurities, the supply of unfiltered oil retained in chamber 23 is immediately drained therefrom and discharged to the inlet side of the filter and subsequently to the sump of the engine lube system through the chamber 26 and conduit 27. The discharging flow of this oil will flush out the accumulated sediment from this chamber thereby presenting a clean sealing surface and avoiding the transfer of unfiltered oil and sediment into space 32 defined between the outer wall of cylinder 21 and the inner wall of core 15b.

Failure to replace a clogged filter may result in a critical flow restriction through the element, thereby starving the bearings of lubricant. The customary precautionary measure is to provide a by-pass to permit unfiltered oil to flow to these areas. In the present invention, a check valve 47 is interposed between the inlet cavity 26 and the outlet cavity 36. When the element 15 becomes clogged to the point where flow is restricted, the increase in pressure in cavity 26 unseats the ball 48 against the action of the spring 49 permitting the lubricant to be distributed to the lubricated areas through conduit 37.

We claim:

1. In a filter, a chamber through which liquid flows, a filter element arranged in said chamber and dividing it into an area for unfiltered liquid and an area for filtered liquid, outlet openings in the bottom of said chamber normally closed by the filter element and opened upon removal of the filter element to drain all oil from the chamber.

2. In a filter, a chamber through which liquid flows, a filter element arranged in said chamber and dividing it into an area for unfiltered liquid and an area for filtered liquid, outlet openings in the bottom of said chamber normally closed by the filter element and opened upon removal of the filter element to drain all oil from the chamber, and means to direct liquid from said outlet openings toward a supply of unfiltered liquid.

3. In a filter, a chamber through which liquid flows, a filter element arranged in said chamber and dividing it into an area for unfiltered liquid and an area for filtered liquid, outlet openings in the bottom of said chamber normally closed by the filter element and opened upon removal of the filter element to drain all oil from the chamber, a second chamber communicating with said area for filtered liquid adjacent its upper end to provide a reservoir for filtered liquid immediately available for use when the filter has been temporarily out of use.

4. In a filter of the character described which comprises a housing, an inlet for unfiltered liquid, an outlet for filtered liquid, a filter chamber receiving liquid between the inlet and outlet, a filter element in said chamber dividing it into areas for filtered liquid and unfiltered liquid, discharge openings in the bottom of said chamber communicating with the source of supply of unfiltered liquid on the inlet side, said filter element normally closing said discharge openings but permitting discharge therethrough of all liquid in the filter chamber when the element is removed whereby unfiltered liquid will not pass to said filtered liquid area during the time when a fouled filter element is being replaced by a clean element.

References Cited in the file of this patent

UNITED STATES PATENTS

| | | |
|---|---|---|
| 2,462,488 | Gunn | Feb. 22, 1949 |
| 2,657,807 | Launder | Nov. 3, 1953 |